United States Patent Office 3,264,330
Patented August 2, 1966

3,264,330
1-HALO-4-METHYLESTRA-1,3,5(10)-TRIENES AND PROCESS THEREFOR
George W. Moersch and Duane F. Morrow, Ann Arbor, Mich., assignors to Parke, Davis & Company, Detroit, Mich., a corporation of Michigan
No Drawing. Filed Apr. 22, 1963, Ser. No. 274,838
10 Claims. (Cl. 260—397.5)

The present invention relates to novel steroid compounds and to methods for their production. More particularly, it relates to 4-methylestra-1,3,5(10)-triene compounds having the formula

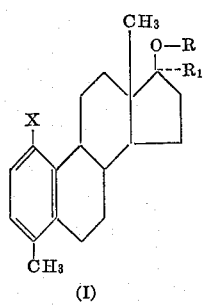
(I)

where X represents a halogen atom; R represents a lower alkanoyl radical, a phenyl-substituted lower alkanoyl radical, or a carboxy-substituted lower alkanoyl radical; and $R_1$ represents a hydrogen atom, a lower alkyl radical, a lower alkenyl radical, or an ethinyl radical. The preferred halogen atom is chlorine, and the preferred lower alkyl radical is methyl.

In accordance with the invention, 4-methylestra-1,3,5 (10)-triene compounds having the formula

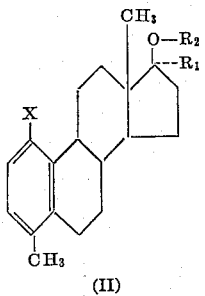
(II)

are prepared by the reaction of androsta-1,4-dien-3-one compounds of the formula

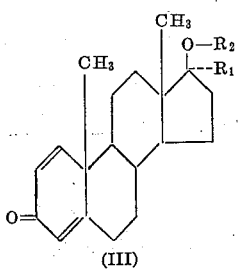
(III)

with an oxalyl halide of the formula

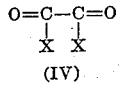
(IV)

in an inert organic solvent; where X represents a chlorine or bromine atom, $R_2$ represents a lower alkanoyl radical, and $R_1$ has the aforementioned significance. Suitable solvents for the reaction are hydrocarbons, such an benzene, toluene, xylene, cyclohexane, and isooctane; ethers, such as diethyl ether and tetrahydrofuran; chlorinated hydrocarbons, such as chloroform and carbon tetrachloride; and mixtures of these. An excess of oxalyl halide is employed, with best results obtained when 15 moles of oxalyl halide are used per mole of androsta-1,4-dien-3-one compound. A 5 to 50-mole excess may also be used, however. It is advantageous to carry out the reaction in the presence of a catalytic amount of oxalic acid, which may be added as such or formed in situ by slight hydrolysis of the oxalyl halide. The temperature may be varied over a wide range from −50° C. to 50° C. It is preferable to contact the reactants dissolved in a suitable solvent at an initial temperature in the range of −50° C. to 0° C., and then carry the reaction to completion at a temperature in the range of 20° C. to 35° C. The reaction is normally completed in a period of 6 to 24 hours duration, but may be carried out successfully during a period varied from 2 to 72 hours.

The androsta-1,4-dien-3-one compounds used as starting materials in the foregoing process can be prepared by the reaction of 17β-hydroxy-androsta-1,4-dien-3-one compounds of the formula

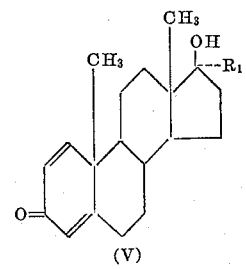
(V)

with a lower alkanoic acid or a reactive derivative thereof, such as the halide or anhydride; where $R_1$ has the aforementioned significance. The 17β-hydroxy-androsta-1,4-dien-3-one compounds of the above formula are prepared by reaction of 17β-hydroxy-androst-4-en-3-one compounds of the formula

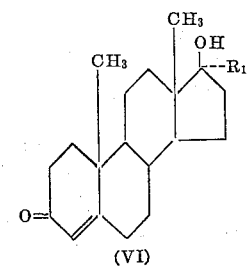
(VI)

with 2,3 - dichloro - 5,6-dicyano-1,4-benzoquinone, where $R_1$ has the aforementioned significance.

The 4-methylestra-1,3,5(10)-triene compounds of the invention having Formula II can also be prepared by the reaction of 3-halo-androsta-1,3,5-triene compounds of the formula

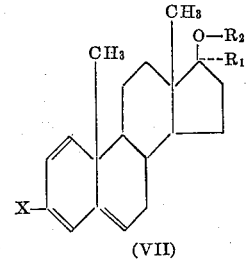
(VII)

with oxalyl chloride or oxalyl bromide in an inert organic solvent; where X, $R_1$, and $R_2$ have the aforementioned significance. Suitable solvents for this reaction are those given above for the foregoing process. Equimolar amounts of the 3-halo-androsta-1,3,5-triene and oxalyl halide may be used, although it is preferable to use the oxalyl halide in excess. The duration of the reaction is not critical, and may be varied from 2 to 72 hours. The reactants are contacted in solution at an initial temperature in the range of −50° C. to 0° C., and the reaction mixture is then warmed to a temperature in the range of 0° C. to 50° C. to carry the reaction to completion.

The 3-halo-androsta-1,3,5-triene compounds of Formula VII, which are the starting materials in the above process, can be prepared by the reaction of androsta-1,4-dien-3-one compounds of Formula III with oxalyl chloride or oxalyl bromide for a period not greater than 2 hours in the absence of any acid in an inert organic solvent, such as a hydrocarbon, an ether, or mixtures of these. It is not desirable to use a chlorinated hydrocarbon, such as chloroform, in this reaction for the preparation of the 3-halo-androsta-1,3,5-triene compounds.

Also in accordance with the invention, 4-methylestra-1,3,5(10)-triene compounds having the formula

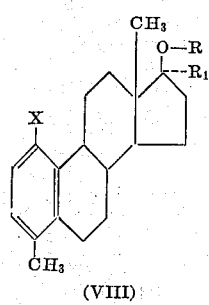

(VIII)

are prepared by the reaction of 4-methyl-17β-hydroxy-estra-1,3,5(10)-triene compounds of the formula

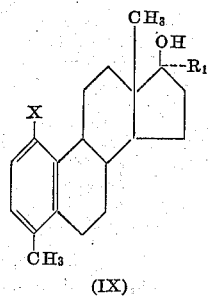

(IX)

with a carboxylic acid of not more than 6 carbon atoms, or a reactive derivative thereof; where X represents a halogen atom, R represents a lower alkanoyl radical, a phenyl-substituted lower alkanoyl radical, or a carboxy-substituted lower alkanoyl radical, and $R_1$ represents a hydrogen atom, a lower alkyl radical, a lower alkenyl radical, or an ethinyl radical. The carboxylic acid employed may be a monocarboxylic acid, such as acetic acid, propionic acid, or β-phenylpropionic acid, or a dicarboxylic acid, such as succinic acid. Reactive derivatives of these which may be used are the halides and anhydrides, or, in the case of the dicarboxylic acids, the mono-halide-mono-ester, such as, for example, β-carbomethoxypropionyl chloride. The preferred reactants are the acid halides and anhydrides. When a carboxylic acid or anhydride is used, it is preferable to add an acidic catalyst, such as p-toluenesulfonic acid. When an acid halide, preferably an acid chloride, is used, a tertiary amine catalyst, such as pyridine or triethylamine, is added in an amount sufficient to bind the hydrohalic acid liberated. Solvents are employed as follows: tertiary amines, such as pyridine and triethylamine, either alone or together with an ether, such as diethyl ether or tetrahydrofuran, or a hydrocarbon, such as benzene, may be used in the reaction with an acid halide or acid anhydride; excess carboxylic acid or an inert solvent, such as benzene or diethyl ether, is employed with an aliphatic carboxylic acid reactant; the solvent may be omitted in the reaction with an acid anhydride, in which case a several-fold excess of anhydride is used. The temperature may be varied over the range, 0–150° C., depending on the reactant and solvent employed. The preferred range for an acid halide reactant is 20–50° C., while for an acid anhydride the preferred range is 20–30° C. when an acidic catalyst is added, and 115–150° C. in the absence of such a catalyst. When a carboxylic acid reactant is used, it is preferable to carry out the reaction at the reflux temperature. The duration of the reaction will also vary over a wide range, depending on the reactant used. With an acid halide, the range is 2 to 24 hours, with a range of 3 to 8 hours preferred. With an acid anhydride, the reaction is normally complete in 1 to 3 hours, although a period as long as 18 hours may be required.

An alternative method for carrying out the foregoing process comprises the initial reaction of 4-methyl-17β-hydroxyestra-1,3,5(10)-triene compounds of Formula IX with a lower alkyl magnesium halide, such as methylmagnesium iodide or ethylmagnesium bromide, and the subsequent reaction of the intermediate of the formula

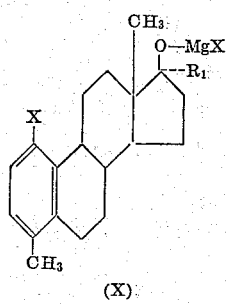

(X)

with an acid halide, in an inert solvent, such as diethyl ether, tetrahydrofuran, or 1,2-dimethoxyethane, at a temperature in the range, 0–50° C., for a period of from 5 to 72 hours. In Formula X, X represents a halogen atom, and $R_1$ has the aforementioned significance.

The 4-methyl-17β-hydroxyestra-1,3,5(10)-triene compounds having Formula IX, which are the starting materials employed in the foregoing process, can be prepared in a number of ways. 1-chloro-4-methyl-17β-hydroxy-estra-1,3,5(10)-triene compounds having the formula

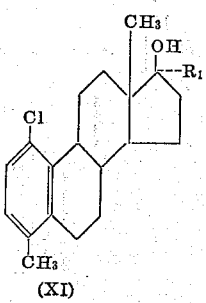

(XI)

are prepared by the reaction of compounds of the formula

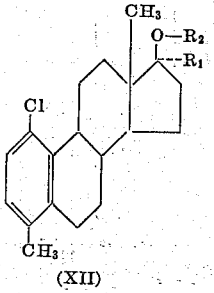

(XII)

with a base, such as potassium hydroxide, in an alcoholic solvent; where $R_1$ and $R_2$ are as previously defined.

4-methyl-17β-hydroxyestra-1,3,5(10)-triene compounds of the formula

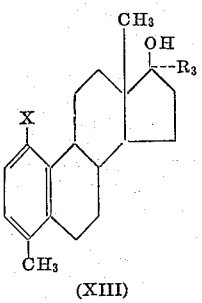

(XIII)

are prepared by the reaction of 4-methylestra-1,3,5(10)-trien-17-one compounds of the formula

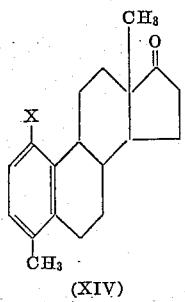

(XIV)

with a reactive organometallic compound of the formula

R₃—M in an inert solvent, followed by hydrolysis of the reaction product with an aqueous medium; where X represents a halogen atom, $R_3$ is lower alkyl, lower alkenyl, or ethinyl, and M represents a metallic residue, such as an alkali metal or a magnesium halide. The 4-methylestra-1,3,5(10)-trien-17-one compounds of Formula XIV, where X is chlorine or bromine, are prepared by the reaction of androsta-1,4-dien-3,17-dione with oxalyl chloride or oxalyl bromide in an inert solvent. Alternatively, the compounds of Formula XIV, where X is chlorine or bromine, can be prepared by the saponification of 1-halo-4-methyl-17β-propionoxyestra-1,3,5(10)-triene and oxidation of the resulting 1-halo-4-methyl-17β-hydroxyestra-1,3,5(10)-triene. 1-fluoro-4-methylestra-1,3,5(10)-trien-17-one, the compound of Formula XIV where X is fluorine, is prepared according to the following reaction sequence: 1-hydroxy-4-methylestra-1,3,5(10)-trien-17-one is reacted with sodium hydride, and the salt obtained is reacted with 4-chloro-2-phenylquinazoline to prepare 4-[4-methyl-17-oxoestra-1,3,5(10)-trien-1-yloxy] - 2 - phenylquinazoline. This quinazoline derivative is subjected to intramolecular rearrangement by heating to give 3-[4-methyl-17-oxoestra-1,3,5(10) - trien - yl] - 2 - phenyl-4(3H)-quinazolinone, having the formula

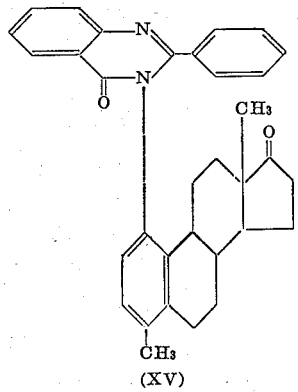

(XV)

and the quinazolinone intermediate is hydrolyzed by base to give 1-amino-4-methylestra-1,3,5(10)-trien-17-one. Di- azotization of the 1-amino-steroid in a mixture of acetic acid and 48% fluoboric acid gives the desired 1-fluoro-4-methylestra-1,3,5(10)-trien-17-one. The 1-amino-steroid can also be diazotized in a mixture of acetic acid, propionic acid and sulfuric acid, and the diazonium salt treated with cuprous bromide and 48% hydrobromic acid to prepare 1-bromo-4-methylestra-1,3,5(10)-trien-17-one.

The compounds of the invention are useful pharmacological agents. They are myotropic agents, possessing a low degree of androgenicity. They are active upon oral administration.

The invention is illustrated by the following examples:

Example 1

A solution of 4.0 g. of 17α-methyl-17β-acetoxyandrosta-1,4-dien-3-one in 200 ml. of dry benzene is dried by distillation to one-half the original volume. After cooling in a Dry Ice bath, the solution is treated with 14 ml. of oxalyl chloride, and the mixture is allowed to stand at room temperature for 20 hours. The mixture is then evaporated to dryness under reduced pressure at 50-60° C., and the residue is warmed for 20 minutes with 50 ml. of a saturated aqueous sodium bicarbonate solution. The solid 1-chloro-4,17α-dimethyl-17β-acetoxyestra-1,3,5(10)-triene obtained is collected, washed with water, dried in vacuo at 50° C., and crystallized from acetone-methanol; M.P. 162–164° C.

Example 2

A solution of 7.0 g. of 17β-propionoxyandrosta-1,4-dien-3-one in 250 ml. of dry benzene is reduced in volume to 120 ml. by distillation. After cooling in a Dry Ice bath, the solution is treated with 20 ml. of oxalyl chloride, and the mixture is kept at room temperature for 24 hours. The mixture is then evaporated to dryness under reduced pressure, and the residue is warmed with 50 ml. of dilute aqueous sodium bicarbonate solution. The aqueous mixture is extracted with benzene, and the benzene solution is washed first with a dilute sodium bicarbonate solution, then with water. After drying over anhydrous magnesium sulfate, the benzene solution is evaporated to dryness to give impure 1-chloro-4-methyl-17β-propionoxyestra - 1,3,5(10)-triene. The crude product is dissolved in 30 ml. of n-hexane, the solution is poured onto a chromatography column prepared from activated magnesium silicate (Florisil), and the product is eluted from the column with additional quantities of n-hexane. After evaporation of the eluates, the product is crystallized from methanol; M.P. 75–76° C.

Example 3

A solution of 0.94 g. of 17α-ethyl-17β-acetoxyandrosta-1,4-dien-3-one in 20 ml. of dry benzene is cooled in a Dry Ice bath, 0.10 g. of oxalic acid dihydrate and 5 ml. of oxalyl chloride are added, and the rection mixture is kept at room temperature overnight. The mixture is then evaporated to dryness under reduced pressure, the residue is dissolved in ether, the ether solution is filtered, and the filtrate is washed first with dilute sodium bicarbonate solution, then with water. After drying over anhydrous magnesium sulfate, the dried solution is evaporated to dryness to give impure 1-chloro-4-methyl-17α-ethyl-17β-acetoxyestra-1,3,5(10)triene. The crude product is dissolved in 20 ml. of n-hexane, the solution is poured onto a chromatography column prepared from 10 g. of activated magnesium silicate, and the product is eluted from the column with mixtures of hexane and benzene. After evaporation of the eluates, the product is crystallized from ethanol-water; M.P. 165–167° C.

17α-ethyl-17β-acetoxyandrosta-1,4-dien-3-one, the compound used as starting material in the above procedure, can be prepared in the following manner: A solution of 6.22 g. of 17α-ethyl-17β-hydroxyandrost-4-en-3-one in 100 ml. of acetic anhydride is heated under reflux for 2½ hours. The solution is then evaporated to near-dryness under reduced pressure, and the residue is triturated twice with warm methanol, evaporated to dryness, and crystallized from methanol to give 17α-ethyl-17β-acetoxyandrost-4-en - 3 - one, M.P. 152–153° C. This product (4.0 g.) is dissolved in 50 ml. benzene together with 3.2 g. of 2,3-dichloro-5,6-dicyano-1,4-benzoquinone, and the solution is heated under reflux for 9½ hours. The solution is cooled, 50 ml. of ether is added, and the resulting mixture is filtered. The filtrate is washed, first with 2 N sodium hydroxide solution and then with water, dried over anhydrous magnesium sulfate, and evaporated to dryness to give 17α-ethyl-17β-acetoxyandrosta-1,4-dien-3-one, M.P. 139–141° C., after crystallization from acetone-n-hexane and recrystallization from n-hexane.

*Example 4*

A solution of 2.0 g. of 3-chloro-17α-methyl-17β-acetoxyandrosta-1,3,5-triene in 50 ml. of dry benzene is cooled in a Dry Ice bath, 7 ml. of oxalyl chloride is added, and the reaction mixture is kept at room temperature for 18 hours. The mixture is then evaporated to dryness under reduced pressure, the residue is triturated with warm saturated aqueous sodium bicarbonate, and the solid 1-chloro-4,17α-dimethyl-17β-acetoxyestra-1,3,5(10)-triene obtained is isolated, washed with water, dried, and crystallized from acetone-methanol; M.P. 163–164° C.

The 3 - chloro-17α-methyl-17β-acetoxyandrosta-1,3,5-triene used as starting material in the above procedure is prepared as follows: A solution of 1.0 g. of 17α-methyl-17β-acetoxyandrosta-1,4-dien-3-one in 25 ml. of dry benzene is cooled in a Dry Ice bath, 6 ml. of oxalyl chloride is added, and the reaction mixture is kept at room temperature for 2 hours. The mixture is then evaporated to dryness under reduced pressure, the residue is triturated with a saturated aqueous sodium bicarbonate solution, and the 3-chloro-17α-methyl-17β-acetoxyandrosta-1,3,5-triene obtained is isolated, washed with water, dried, and crystallized from acetone-methanol; M.P. 172–174° C.

*Example 5*

A solution of 1.75 g. of 1-chloro-4,17α-dimethyl-17β-hydroxyestra-1,3,5(10)-triene in 160 ml. of anhydrous ether is treated with 6.5 ml. of 0.91 M ethereal ethyl magnesium bromide. The reaction mixture is then stirred while a solution of 7.16 ml. (7.63 g.) of propionyl chloride in 20 ml. of anhydrous ether is added dropwise over a fifteen-minute period. The resulting mixture is stirred at room temperature for 62 hours, and is then poured into a mixture of ice and 250 ml. of saturated aqueous sodium bicarbonate solution. After standing one hour, the ether layer is isolated, and the aqueous phase is extracted with ether. The combined ether solutions are washed, first with dilute sodium bicarbonate solution, then with water, and dried over anhydrous magnesium sulfate. The dried solution is evaporated to dryness under reduced pressure, and the residue is crystallized from methanol to give 1-chloro - 4,17α - dimethyl-17β-propionoxyestra-1,3,5(10)-triene, M.P. 98–99° C., after recrystallization from methanol.

The 1 - chloro - 4,17α-dimethyl-17β-hydroxyestra-1,3,5 (10)-triene used as starting material in the above procedure is prepared as follows: A solution containing 1.5 g. of 1 - chloro-4,17α-dimethyl-17β-acetoxyestra-1,3,5(10)-triene, 100 ml. of ethanol, 3 ml. of 40% aqueous potassium hydroxide, and 2 ml. of water is heated under reflux for 2½ hours on the steam bath. After cooling, the solution is diluted with water, and the solid 1-chloro-4,17α-dimethyl-17β-hydroxyestra-1,3,5(10)-triene obtained is isolated, washed with water, dried in vacuo at 50° C., and crystallized, first from methanol, then from n-hexane; M.P. 156–158° C.

*Example 6*

A solution of 2.23 g. of 1-chloro-4,17α-dimethyl-17β-hydroxyestra-1,3,5(10)-triene in 200 ml. of anhydrous ether is treated with 8.2 ml. of 0.94 M ethereal ethyl magnesium bromide. The mixture is then stirred while a solution of 1:58 g. of β-carbomethoxypropionyl chloride in 20 ml. of anhydrous ether is added dropwise over a ten-minute period. The resulting mixture is stirred at room temperature for 65 hours, and is then poured over ice. After standing 3 hours, the mixture is extracted well with ether, and the combined ether extracts are thoroughly washed, first with dilute sodium bicarbonate solution, then with water, and dried over anhydrous magnesium sulfate. The dried solution is evaporated to dryness, and the residue is dissolved in ethanol. A slight excess of 10% aqueous sodium hydroxide solution is added, and the mixture is cooled and diluted with water to precipitate the crude sodium salt of 1-chloro-4,17α-dimethylestra-1,3,5(10)-trien - 17β-ol hemisuccinate. The mixture containing the crude salt is extracted with ether, the ether extract is evaporated to dryness, and the residue is dissolved in 150 ml. of hot water. After cooling, the solution is acidified with 3 N hydrochloric acid, and the 1-chloro-4,17α-dimethylestra-1,3,5(10)-trien-17β-ol hemisuccinate obtained is isolated, washed with water, dried, and crystallized from acetone-n-hexane; M.P. 142–143° C.

*Example 7*

A solution of 2.55 g. of 1-chloro-4,17α-dimethyl-17β-hydroxyestra-1,3,5(10)-triene in 240 ml. of anhydrous ether is treated with 2.7 ml. of 3 M ethereal methyl magnesium bromide. After the addition of two drops of pyridine, a solution of 1.35 g. of β-phenylpropionyl chloride in 10 ml. of anhydrous ether is added, and the reaction mixture is stirred and heated under reflux for 5 hours. After cooling, the mixture is poured into 300 ml. of a saturated aqueous sodium bicarbonate solution and allowed to stand at room temperature overnight. The ether layer is separated, washed first with saturated aqueous sodium bicarbonate, then with water, dried over anhydrous magnesium sulfate, and evaporated to dryness under reduced pressure. The yellow oil obtained is extracted with 100 ml. of n-hexane, and the hexane solution is purified by filtration, and evaporated to dryness under reduced pressure. The residue is dissolved in 20 ml. of hot n-hexane, and the hexane solution is poured onto a chromatography column prepared from 12 g. of activated magnesium silicate. The column is eluted with n-hexane, and the eluates are evaporated to dryness to give 1-chloro-4,17α-dimethylestra - 1,3,5(10)-trien-17β-ol β-phenylpropionate ester, M.P. 100–101° C., after recrystallization from acetone-methanol.

*Example 8*

A solution of 0.70 g. of 1-chloro-4-methyl-17β-hydroxyestra-1,3,5(10)-triene in 30 ml. of acetic anhydride is heated under reflux for 2 hours. The solution is then evaporated to dryness, and the 1-chloro-4-methyl-17β-acetoxyestra-1,3,5(10)-triene obtained is crystallized from n-hexane; M.P. 121–122° C.; $[\alpha]_D^{23}$ +180° (1.07% in choloroform).

The 1-chloro-4-methyl-17β-hydroxyestra-1,3,5(10)-triene used as starting material in the procedure of this example is prepared as follows: A solution of 2.5 g. of 1-chloro-4-methyl-17β-propionoxyestra-1,3,5(10-triene in 90 ml. of 5% ethanolic potassium hydroxide is refluxed under nitrogen for one hour. After cooling in ice, the solution is diluted with water, and the precipitated solid is isolated and dissolved in benzene. The benzene solution is washed with water, dried over anhydrous magnesium sulfate, and evaporated to dryness under reduced pressure to give 1-chloro-4-methyl-17β-hydroxyestra-1, 3,5(10)-triene. After crystallization from aqueous methanol, the product, containing methanol of crystallization, melts at 70° C.

Example 9

A solution of 1.05 g. of 1-chloro-4-methyl-17α-ethinyl-17β-hydroxyestra-1,3,5(10)-triene in 40 ml. acetic anhydride is heated under reflux for 2.5 hours. The solution is then evaporated to near-dryness under reduced pressure, and the residue is triturated twice with methanol and evaporated to dryness. The crude 1-chloro-4-methyl-17α-ethinyl-17β-acetoxyestra-1,3,5(10)-triene is dissolved in benzene, the benzene solution is poured onto a chromatography column prepared from activated magnesium silicate, and the product is eluted from the column with additional quantities of benzene. The eluates are evaporated to dryness and the purified product is crystallized from ethanol; M.P. 200–201.5° C.; $[\alpha]_D^{23}$ +98.7° (0.74% in chloroform).

The 1-chloro-4-methyl-17α-ethinyl-17-β-hydroxyestra-1,3,5(10)-triene used as starting material in the above procedure can be prepared as follows: A solution of 0.7 g. of 1-chloro-4-methyl-17β-hydroxyestra-1,3,5(10)-triene in 75 ml. of acetic acid is cooled in an ice bath while 3 ml. of Jones' reagent (prepared from 26.72 g. of chromium trioxide and 23 ml. of concentrated sulfuric acid, diluted to 100 ml. with water) is added. After standing at room temperature for one hour, the mixture is poured into ice-water, and the precipitated 1-chloro-4-methylestra-1,3,5(10)-trien-17-one is isolated, washed with water, dried, and crystallized, first from methanol, then from acetone-methanol; M.P. 151–153° C. This product is dissolved in 25 ml. of dry tetrahydrofuran, and the solution is added to a solution of ethinyl magnesium bromide prepared as follows: Ethyl bromide (12 ml.) is added to a slurry of 4.5 g. of magnesium in 260 ml. of dry ether; 220 ml. of the resulting ethereal solution of ethyl magnesium bromide is added to 260 ml. of dry tetrahydrofuran, and acetylene is passed into this solution over a period of 1.5 hours. The reaction mixture is heated under reflux for 3 hours, decomposed by adding 200 ml. of a saturated aqueous ammonium chloride solution, and evaporated to dryness under reduced pressure. The residue is extracted with methylene chloride, and the methylene chloride solution is washed with water, dried over anhydrous magnesium sulfate, and evaporated to dryness. The crude 1-chloro-4-methyl-17α-ethinyl-17β-hydroxyestra-1,3,5(10)-triene obtained is dissolved in a 1:1 mixture of benzene and n-hexane, the solution is poured onto a chromatography column prepared from 15 g. of activated magnesium silicate, and the product is eluted from the column with additional quantities of the same solvent mixture. Evaporation of the eluates and crystallization from aqueous methanol gives 1-chloro-4-methyl-17α-ethinyl-17β-hydroxyestra-1,3,5(10)-triene, M.P. 160–163° C., used without further purification.

Example 10

A solution of 1.35 g. of 1-chloro-4-methyl-17α-allyl-17β-hydroxyestra-1,3,5(10)-triene in 40 ml. of acetic anhydride is heated under reflux for 9 hours. The solution is then evaporated to dryness, and the 1-chloro-4-methyl-17α-allyl-17β-acetoxyestra-1,3,5(10)-triene obtained is crystallized four times from methanol; M.P. 133.5–134.5° C.; $[\alpha]_D^{23}$ +172° (1.09% in chloroform).

The 1-chloro-4-methyl-17α-allyl-17β-hydroxyestra-1,3,5(10)-triene used as starting material in the above procedure is prepared as follows: A mixture containing 0.5 g. of androsta-1,4-dien-3,17-dione, 4 ml. of oxalyl chloride, and 0.5 g. of oxalic acid dihydrate in 30 ml. of benzene is kept at room temperature overnight, filtered, and evaporated to dryness. The residue is warmed with a saturated solution of sodium bicarbonate for a few minutes, the mixture is cooled, and the solid 1-chloro-4-methylestra-1,3,5(10)-trien-17-one obtained is isolated by filtration, washed with water, dried and crystallized, first from methanol, then from acetone-methanol; M.P. 151–153° C. This compound (2.00 g.) is dissolved in 75 ml. of anhydrous ether, and to the solution is added a solution of allyl magnesium bromide prepared by adding 5.7 ml. (8.0 g.) of allyl bromide in 80 ml. of dry ether to a rapidly stirred slurry of 3.1 g. of magnesium turnings in 20 ml. ether over a 5-hour period. The reaction mixture is refluxed for 1.5 hours, and then decomposed by the dropwise addition of 75 ml. of 20% aqueous ammonium chloride. The ether layer is separated, the aqueous layer is extracted with ether, and the combined ether solutions are washed with water and dried over anhydrous magnesium sulfate. The dried solution is evaporated to dryness, and the 1-chloro-4-methyl-17α-allyl-17β-hydroxyestra-1,3,5(10)-triene obtained is crystallized from methanol and recrystallized several times from methanol-water; M.P. 151–152° C.; $[\alpha]_D^{23}$ +190° (1.1% in chloroform).

Example 11

A solution of 0.975 g. of 1-fluoro-4,17α-dimethyl-17β-hydroxyestra-1,3,5(10)-triene in 30 ml. of acetic anhydride is heated under reflux for 1.5 hours. The solution is cooled, and 35 ml. of methanol is added. The resulting solution is then heated under reflux for 30 minutes more, evaporated to dryness under reduced pressure, and the 1-fluoro-4,17α-dimethyl-17β-acetoxyestra-1,3,5(10)-triene obtained is crystallized twice from methanol; M.P. 137.5–138.5° C.; $[\alpha]_D^{23}$ +95.6° (0.7% in chloroform).

The 1-fluoro-4,17α-dimethyl-17β-hydroxyestra-1,3,5(10)-triene used as starting material in the foregoing process is prepared by means of the following sequence of reactions:

To a solution of 5.47 g. of 1-hydroxy-4-methylestra-1,3,5(10)-trien-17-one in 200 ml. of purified diglyme is added 0.94 g. of a 53% dispersion of sodium hydride in mineral oil, and the reaction mixture is stirred and heated to 60° under nitrogen until no more hydrogen is evolved. 4-chloro-2-phenylquinazoline (4.40 g.) is added, and the mixture is heated at 200° C. for 10 hours in a nitrogen atmosphere maintained at a pressure of 50 pounds per square inch. After cooling, the mixture is poured into a concentrated sodium chloride solution, and the precipitated 4-[4-methyl-17-oxoestra-1,3,5(10)-trien-1-yloxy]-2-phenylquinazoline is isolated, washed well with water, air dried, and used without further purification; M.P. 75–83° C.

A suspension of the crude imino ether (10.30 g.) in 100 ml. of heavy mineral oil is stirred and heated at 330° C. in a nitrogen atmosphere for 5 hours. The mixture is cooled to room temperature, diluted with 100 ml. of petroleum ether, cooled in an ice-bath, and the precipitated 3-[4-methyl-17-oxoestra-1,3,5(10)-trien-1-yl]-2-phenyl-4(3H)-quinazolinone is isolated, washed with ice-cold petroleum ether, and air-dried. This crude product is used without further purification. An additional amount of crude product is obtained by concentrating the filtrate on the steam bath, cooling, extracting with methanol, evaporating the methanol solution to dryness on the steam bath, extracting the residue once again with methanol, pouring the methanol solution into water, and isolating and air-drying the precipitated solid.

A solution containing 18.25 g. of the crude product from above and 150 g. of sodium hydroxide in a mixture of 1300 ml. of ethanol and 300 ml. of water is heated under reflux for 7 hours. The solution is cooled in ice while 525 ml. of 12 N hydrochloric acid is added, and the mixture is kept at room temperature overnight. The mixture is then stirred and heated under reflux for 1.5 hours, cooled, and filtered to remove the precipitated sodium chloride. The precipitate is washed well with ethanol, and the filtrate and ethanol washings are combined, concentrated under reduced pressure, poured into water, and the aqueous mixture is filtered. The filtrate is made basic with concentrated sodium hydroxide solution, and saturated with potassium carbonate. The precipitated 1-amino-4-methylestra-1,3,5(10)-trien-17-one is isolated, washed well with water, and dried under reduced pressure at 60° C.; M.P. 215–218° C., after crystallization from n-hexane; $[\alpha]_D^{23}$ +315° (0.6% in methanol).

A solution of 0.283 g. of 1-amino-4-methylestra-1,3,5(10)-trien-17-one in a mixture of 2.5 ml. of acetic acid, 3 ml. of water, and 7 ml. of 48% fluoboric acid is cooled in an ice-bath while 0.7 g. of solid sodium hydroxide is added. The resulting solution is kept at 2° C. while a solution of 0.076 g. of sodium nitrite in 2 ml. of water is added over a 10-minute period. The solution is stirred at 0° C. for 30 minutes and at room temperature for 30 minutes. It is then poured into 400 ml. of water, and the precipitated 1-fluoro-4-methylestra-1,3,5(10)-trien-17-one is isolated and dried in air. The crude product in benzene solution is poured onto a chromatography column prepared from Woelm neutral alumina of activity grade 1, and the product is eluted from the column with a 10% ether-90% benzene solvent mixture. The eluates are evaporated to dryness, and the purified 1-fluoro-4-methylestra-1,3,5(10)-trien-17-one is crystallized from methanol; M.P. 196–197° C.; $[\alpha]_D^{23}$ +196° (0.6% in chloroform).

To a solution of 1.50 g. of 1-fluoro-4-methylestra-1,3,5(10)-trien-17-one in a mixture of 80 ml. of dry ether and 20 ml. of dry benzene is added 5 ml. of a 3 M solution of methyl magnesium bromide in ether, and the mixture is stirred and heated under reflux for one hour. After cooling, the mixture is decomposed with 20% ammonium chloride solution, and the organic layer is separated, washed with water, and dried over anhydrous magnesium sulfate. The dried solution is evaporated to dryness on the steam bath, and the 1-fluoro-4,17α-dimethyl - 17β - hydroxyestra-1,3,5(10)-triene obtained is crystallized from ether-petroleum ether and recrystallized from methanol; 177–177.5° C.; $[\alpha]_D^{23}$ +100° (0.6% in methanol).

*Example 12*

A suspension of 0.99 g. of 1-bromo-4,17α-dimethyl-17β-hydroxyestra-1,3,5(10)-triene in 30 ml. of acetic anhydride is heated under reflux for 1.5 hours. The solution is cooled, 35 ml. of methanol is added, and the resulting solution is heated under reflux for an additional 30 minutes. The solution is then evaporated to dryness under reduced pressure, and the 1-bromo-4,17α-dimethyl-17β-acetoxyestra-1,3,5(10)-triene obtained is purified by trituration with methanol, followed by crystallization from methanol and recrystallization from n-hexane; M.P. 147–148° C.; $[\alpha]_D^{23}$ +187° (0.6% in chloroform).

The 1 - bromo-4,17α-dimethyl-17β-hydroxyestra-1,3,5-(10)-triene used as starting material in the above procedure is prepared as follows: A solution containing 0.283 g. of 1-amino-4-methylestra-1,3,5(10)-trien-17-one in a mixture of 6 ml. of acetic acid, 2 ml. of propionic acid, 7 ml. of water, and 1 ml. of concentrated sulfuric acid is cooled to −15° C. in an ice-salt bath, and a solution of 0.076 g. of sodium nitrite in 2 ml. of water is added over a ten-minute period while the temperature is maintained at −15°±1° C. The mixture is kept at −15° C. for an additional 20 minutes, and a solution of 0.500 g. of cuprous bromide in a mixture of 2 ml. of water and 3 ml. of 48% hydrobromic acid, previously cooled to −10° C., is added. The mixture is then stirred at 0° C. for 1 hour, at room temperature for 30 minutes, and on the steam bath for 30 minutes. After cooling, the solution is poured into 400 ml. of 5% hydrobromic acid, and the precipitated 1-bromo-4-methylestra-1,3,5-(10)-trien-17-one is isolated by filtration and dried at 60° C. under reduced pressure. The crude product in benzene solution is poured onto a cromatography column prepared from Woelm neutral alumina of activity grade 1 and the product is eluted from the column with a 10% ether-90% benzene solvent mixture. Evaporation of the eluates gives pure 1-bromo-4-methylestra-1,3,5(10)-trien-17-one; M.P. 175–176° C., after recrystallization from methanol; $[\alpha]_D^{23}$ +292° (0.4% in methanol). This compound (1.71 g.) is dissolved in a mixture of 20 ml. of benzene and 80 ml. of ether, 5 ml. of a 3 M solution of methyl magnesium bromide in ether is added, and the resulting mixture is stirred and heated under reflux for 1 hour. After cooling, the reaction mixture is decomposed with 75 ml. of cold saturated ammonium chloride solution, the organic phase is separated, washed well with water, and dried over anhydrous magnesium sulfate. The dried solution is evaporated to dryness, and the 1-bromo-4,17α-dimethyl - 17β - hydroxyestra-1,3,5(10)-triene obtained is crystallized from ether-petroleum ether; M.P. 159–159.5° C.; $[\alpha]_D^{23}$ +200° (1% in methanol).

We claim:

1. 4-methylestra-1,3,5(10)-triene compounds having the formula

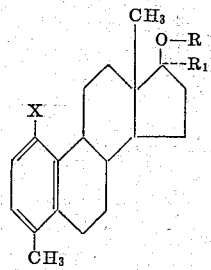

where X is a halogen atom; R is a member of the class consisting of lower alkanoyl, phenyl-substituted lower alkanoyl, and carboxy-substituted lower alkanoyl; and $R_1$ is a member of the class consisting of hydrogen, lower alkyl, lower alkenyl, and ethinyl.

2. 1-chloro-4,17α-dimethyl - 17β - acetoxyestra - 1,3,5(10)-triene.

3. 1 - chloro-4-methyl-17β-propionoxyestra-1,3,5(10)-triene.

4. 1 - chloro-4-methyl-17α-ethinyl - 17β - acetoxyestra-1,3,5(10)-triene.

5. 1-chloro-4-methyl-17α-allyl-17β-acetoxyestra - 1,3,5(10)-triene.

6. 1 - chloro-4,17α-dimethyl-17β-propionoxyestra-1,3,5(10)-triene.

7. Process for the production of 4-methylestra-1,3,5(10)-triene compounds having the formula

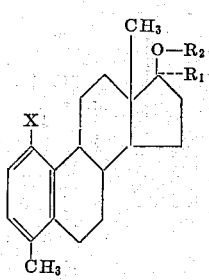

which comprises the reaction of androsta-1,4-dien-3-one compounds of the formula

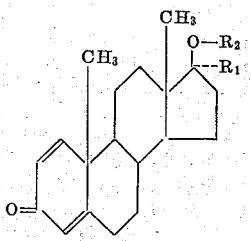

with an oxalyl halide of the formula

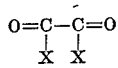

in an inert organic solvent; where X is a member of the class consisting of chlorine and bromine, $R_1$ is a member of the class consisting of hydrogen, lower alkyl, lower alkenyl, and ethinyl, and $R_2$ is lower alkanoyl.

8. Process according to claim 7 wherein 17α-methyl-17β-acetoxyandrosta-1,4-dien-3-one is reacted with oxalyl chloride to produce 1-chloro-4,17α-dimethyl-17β-acetoxyestra-1,3,5(10)-triene.

9. Process for the production of 4-methylestra-1,3,5(10)-triene compounds having the formula

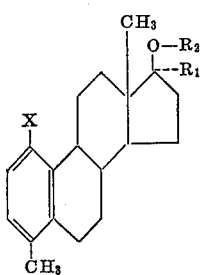

which comprises the reaction of 3-halo-androsta-1,3,5 triene compounds of the formula

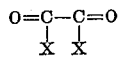

with an oxalyl halide of the formula $$O=C-C=O$$
$$\phantom{O=}X\phantom{-C}X$$

in an inert organic solvent; where X is a member of the class consisting of chlorine and bromine, $R_1$ is a member of the class consisting of hydrogen, lower alkyl, lower alkenyl, and ethinyl, and $R_2$ is lower alkanoyl.

10. Process according to claim 9 wherein 3-chloro-17α-methyl-17β-acetoxyandrosta-1,3,5-triene is reacted with oxalyl chloride to produce 1-chloro-4,17α-dimethyl-17β-acetoxyestra-1,3,5(10)-triene.

References Cited by the Examiner
UNITED STATES PATENTS 3,053,858  9/1962  Mills _____ 260—397.3

LEWIS GOTTS, *Primary Examiner.*

T. MESHBESHER, *Assistant Examiner.*